United States Patent [19]

Hold et al.

[11] 4,289,319
[45] Sep. 15, 1981

[54] ROTARY SEAL CONSTRUCTION AND PROCESSOR

[75] Inventors: Peter Hold, Milford, Conn.; Zehev Tadmor, Teaneck, N.J.

[73] Assignee: USM Corporation, Farmington, Conn.

[21] Appl. No.: 935,782

[22] Filed: Aug. 22, 1978

[51] Int. Cl.³ .......................... B01F 7/10; F16J 15/26; F16J 15/48
[52] U.S. Cl. ...................................... 277/59; 277/124; 366/97
[58] Field of Search ....................... 277/59, 67, 68, 69, 277/123, 124, 233, DIG. 8; 366/97, 307

[56] References Cited

U.S. PATENT DOCUMENTS

| 1,932,809 | 10/1933 | Wheeler | 277/203 |
| 1,974,362 | 9/1934 | Marsh | 92/194 |
| 4,142,805 | 3/1979 | Tadmor | 366/307 |

FOREIGN PATENT DOCUMENTS 1685117 6/1934 Switzerland ........................ 277/102
408870 4/1934 United Kingdom ................... 277/59

OTHER PUBLICATIONS

"Neoprene Notebook" Apr. 1952 pp. 322, 323 by W. N. Damonle & T. T. Wilkinson.

Primary Examiner—Robert I. Smith
Attorney, Agent, or Firm—Benjamin C. Pollard; John P. Morley; Vincent A. White

[57] ABSTRACT

A seal construction and rotary processor including the seal construction in which the seal includes nested truncated conical members of thin stiffly-resilient material interposed between relatively rotatable coaxial surfaces with inner edge portions of the members adjacent and in flow resistant relation to one, and outer edge portions adjacent and in flow resistant relation to the other of the surfaces, marginal portions at either the inner or the outer edge portions of the loops being held to enable pressure against the loops to force the outer or inner edges respectively into improved sealing relation to the surface to which they are adjacent.

11 Claims, 21 Drawing Figures

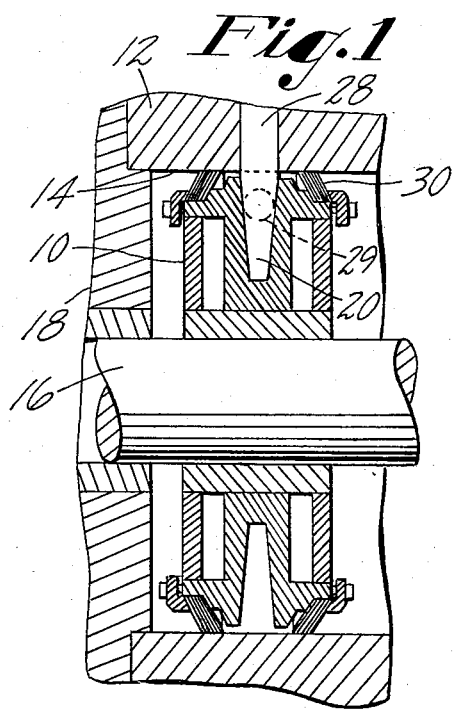
Fig.1
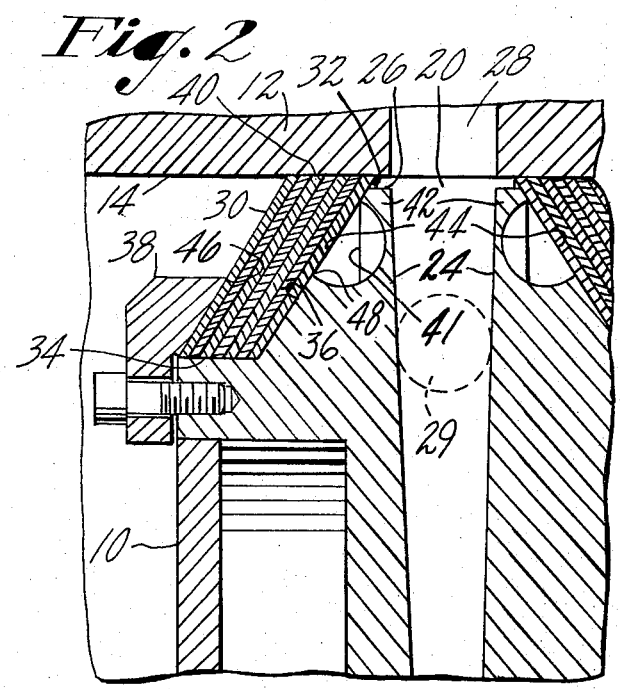
Fig.2
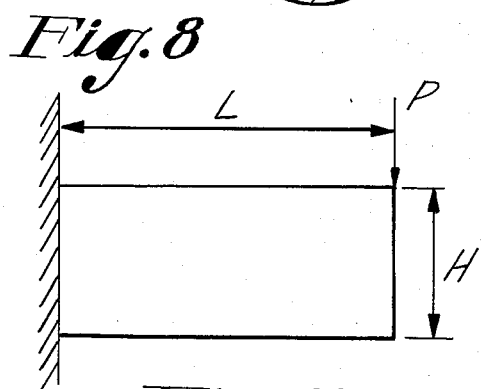
Fig.8
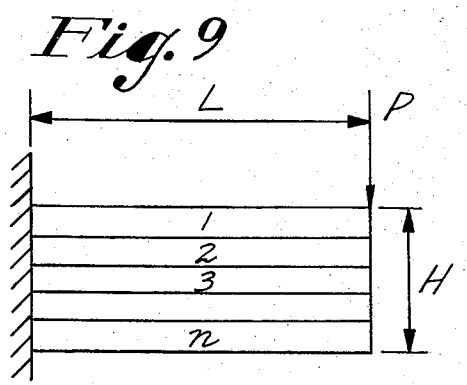
Fig.9
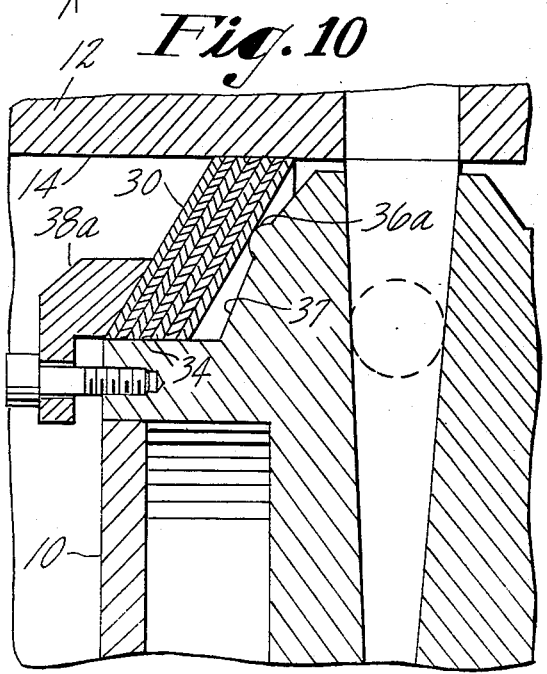
Fig.10
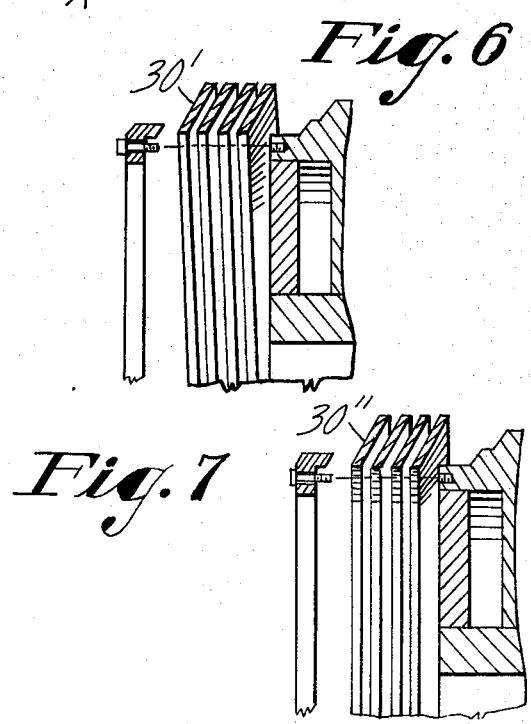
Fig.6
Fig.7

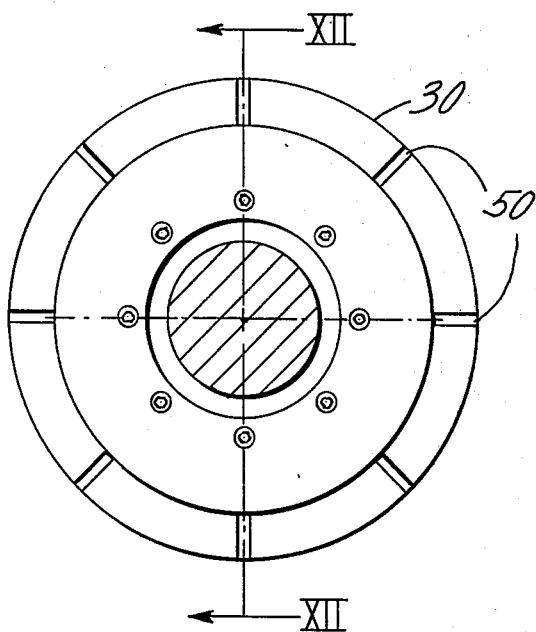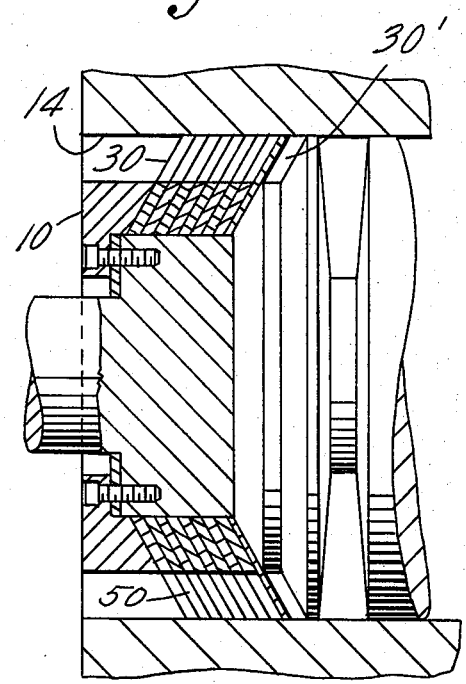

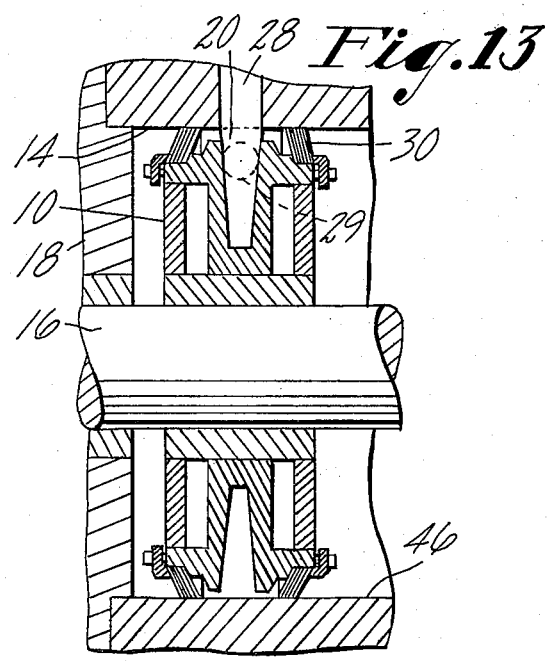
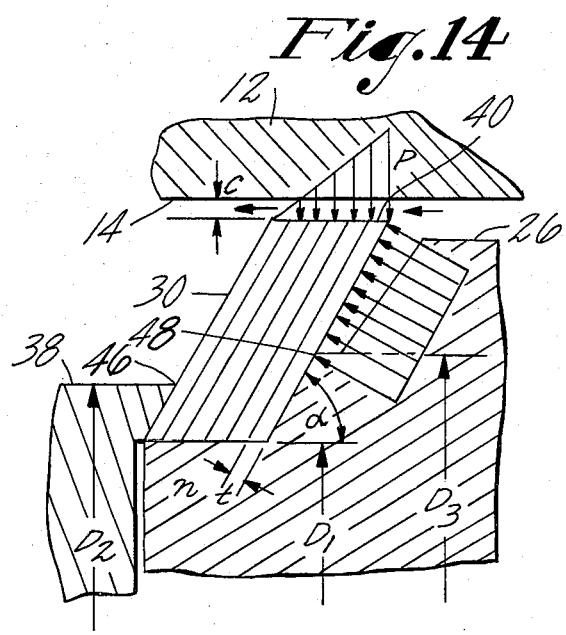
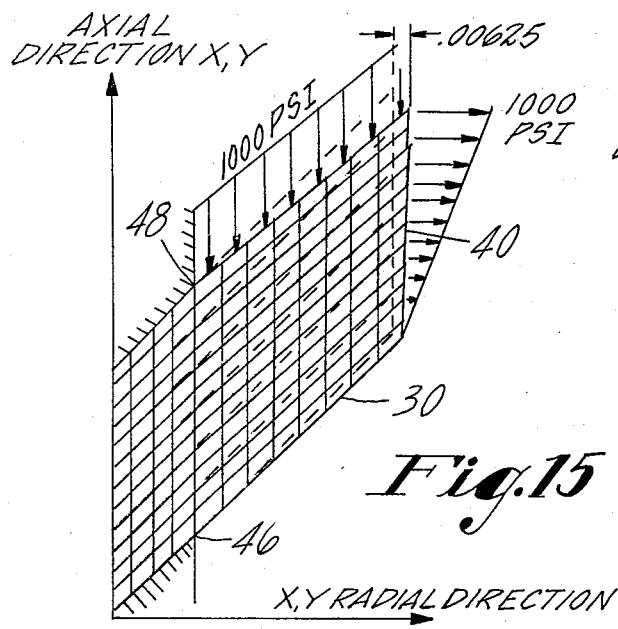
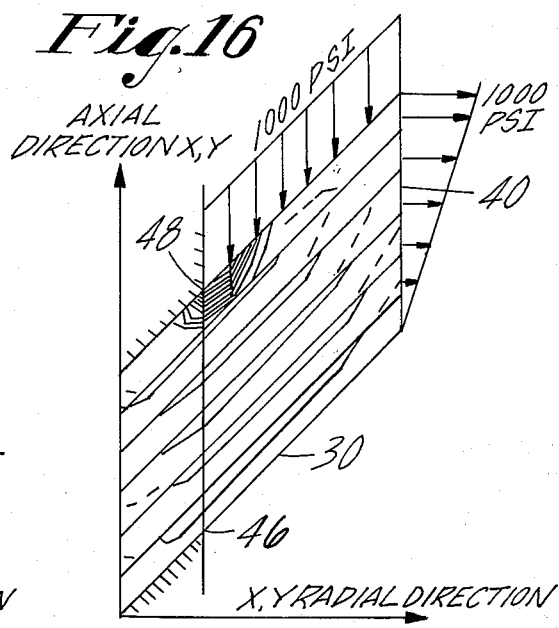
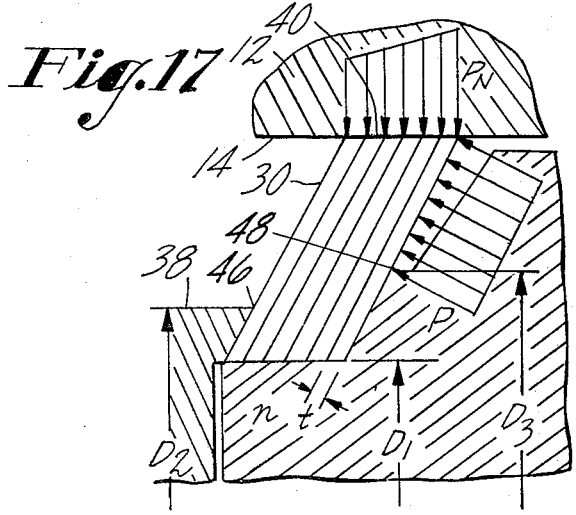
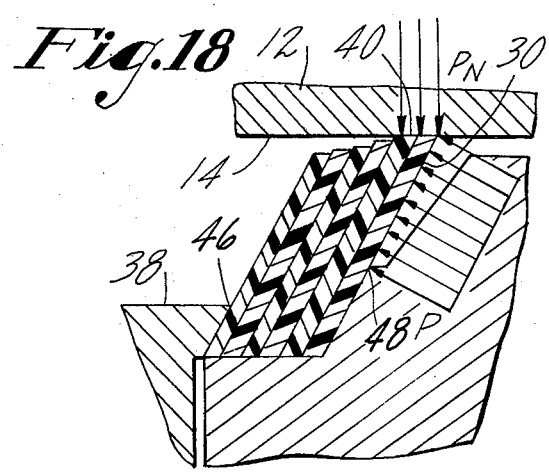

ROTARY SEAL CONSTRUCTION AND PROCESSOR

FIELD OF THE INVENTION

This invention relates to a rotary seal construction and to a processor for plastic and polymeric materials including that seal.

BACKGROUND OF THE INVENTION

A major problem in devices such as the rotary processor shown in the co-pending application of Zehev Tadmor, Ser. No. 795,211, entitled "Method and Apparatus for Processing Polymeric Material", now Pat. No. 4,142,805 filed May 11, 1977, as a continuation-in-part of Application Ser. No. 654,040, filed Feb. 2, 1976and now abandoned, is establishing a seal between a rotary portion of the apparatus and a stationary portion of the apparatus, which will be capable of resisting leakage of liquid from channels of the processor.

Depending upon the process an individual channel in the rotor performs, it might generate high or moderate pressure. The pressure which increases linearly might be distributed along the complete circumference or only along a portion of the circumference or a sequence of pressure rises followed by sharp drops following a mixing element might take place. The processing channel to be sealed might be located between other channels with different pressure profiles around the perimeter receiving material from an upstream channel and discharging it into a downstream channel or discharging the material under relatively high pressure to the outside. The elements located at the ends of a string of channels might either be receiving material and operate at moderate pressure or discharge melt at high pressure. In the case of end channels, prevention of leakage is a very important problem. In the case of intermediate channels, leakage flow is of lesser importance. In applications of the rotary processor where power consumption has to be held at a low level, the power dissipated in the seal is a critical factor in the design of the seal. In other applications where a high power input is essential to achieve certain desired modifications of the state of the polymer, a somewhat higher power consumption in the seal can be tolerated if other advantages can be achieved that way.

Another important problem to be considered in the design of a seal for the rotary processor is the fact that the polymers to be processed in that device are generally degrading as a result of temperature and shear. The designer of seals for other materials (oils), although he might be using similar design elements, is generally not confronted with this problem.

SUMMARY OF THE INVENTION

It is an object of the present invention to provide a low friction positive seal usable at high temperatures to prevent or minimize leakage at high and low pressures between relatively rotating substantially coaxial surfaces.

It is a further object to provide a seal which will minimize power losses.

It is an additional object to avoid stagnation and degradation of material in the seal area.

It is a still further object to provide an improved rotary processor for polymeric plastic materials including a positive seal against leakage from regions of high pressure confined between substantially coaxial relatively rotatable members.

To these ends and in accordance with a feature of the present invention, we have provided a seal construction and rotary processor including the seal construction in which the seal includes nested truncated conical members of thin stiffly-resilient material interposed between relatively rotatable coaxial surfaces with inner edge portions of the members adjacent and in flow resistant relation to one, and outer edge portions adjacent and in flow resistant relation to the other of the surfaces, marginal portions at either the inner or the outer edge portions of the members being held to enable pressure against the members to force the outer or inner edges respectively into improved sealing relation to the surface to which they are adjacent.

BRIEF DESCRIPTION OF THE DRAWINGS

Reference is made to the attached drawings forming part of the disclosure of the present case in which:

FIG. 1 is a side elevation of a rotary processor including the seal construction with parts broken away to show the rotor, channel and annular conical member seal;

FIG. 2 is a fractional sectional view on an enlarged scale showing the relation between the annular conical members, the shoulders on the rotor and the retaining ring and also showing a flexible lip for cooperation with the annular conical members to minimize product contamination;

FIG. 4a is a diagrammatic view showing the rotary processor channel of FIG. 3 developed into a plane.

FIG. 4b is a schematic chart correlating the pressure distribution along the length of the processor channel as developed into a plane in FIG. 4a;

FIG. 4c is a schematic chart correlating the clearance between the outer diameter of the rotor and the interior surface of the housing showing the correlation of its position along the processor channel developing into a plane in FIG. 4a.

FIG. 6 is a fractional view with parts in exploded relation showing a helical form of annular conical member;

FIG. 7 is a fractional view with parts in exploded relation showing a ring form of annular conical member;

FIG. 8 is a force diagram showing the relation of pressure and dimensions on a solid cantilever beam;

FIG. 9 is a force diagram showing the relation of pressure and dimensions on a multi-layer cantilever beam;

FIG. 10 is a fractional view on an enlarged scale showing the relation of annular conical members, retaining ring, and a special form of shoulder on the rotor;

FIG. 11 is a plan view of a modified form of annular conical member including radial cuts for greater responsiveness to local pressure conditions;

FIG. 12 is a fractional sectional view of an assembly of modified annular conical members shown in FIG. 11;

FIG. 13 is a side elevational view with parts broken away showing a form of a processor having a seal in which the axis of the rotor is displaced to provide extra sealing action in a portion of the circumference of the processing chamber;

FIG. 14 is a fractional view on an enlarged scale illustrating a further relation of the annular conical members to a surface of the housing of the processor;

FIG. 15 is a force diagram showing the deflection of the conical members under the action of pressure;

FIG. 16 is a force diagram showing the stresses generated on conical members due to pressure generated in the processor;

FIG. 17 is a fractional view on an enlarged scale showing the sealing pressures generated by the action of fluid pressure in a processing chamber; and FIG. 18 is a fractional view of an enlarged scale showing a seal including annular conical members of full diameter and annular conical members of reduced diameter.

DESCRIPTION OF THE PREFERRED EMBODIMENT

Figure 3:
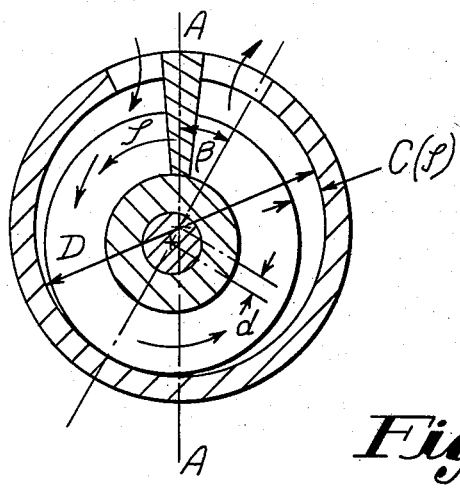
FIG. 3 is a diagrammatic cross-sectional view of a rotary processor marked off with angles and reference points for purposes of explanation of the condition existing in the processor.

The invention will be described in relation to its use in a rotary processor apparatus such as shown in the above-referred to application of Zehev Tadmor, but it will be understood that the seal is useful in other relations where a seal must be established between rotating surfaces to resist high pressure. For example, the seal may be used in rotary pumps, high pressure mixers and so on.

As discussed in greater detail in the application of Tadmor, above referred to, that processing apparatus (see FIGS. 1 and 2) includes a rotor 10 which is mounted for rotation in a housing 12 having a cylindrical interior surface 14, the rotor being supported on a drive shaft 16 journalled in end walls 18 of the housing 12. The rotor has one or a plurality of channels 20, each including opposed side walls 24 in fixed relation to each other, and having circular, usually cylindrical, portions 26, coaxial with, and in close, spaced relation to, the interior surface 14 of the housing 12 on each side of the channel 20. The channel 20 and interior surface 14 of the housing 12 form an enclosed passage way into which material is introduced for processing through an inlet opening 28. Movement of the channel drags material adjacent the channel walls 24 to an end block (not shown) where processed material collects and is discharged through an outlet opening 29 in the housing 12. Pressure is generated by dragging of material on the channel walls 24 toward the channel block so that the channel becomes a region of increasingly high pressure in the direction of rotation.

Figures 4A, 4B:
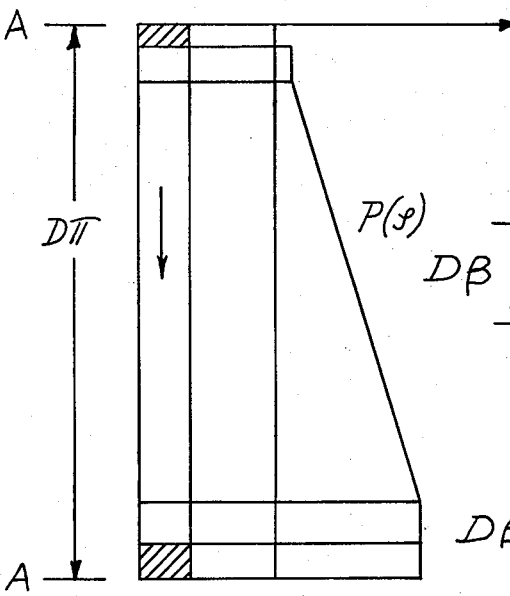

As illustrated diagrammatically in FIGS. 3, 4a, b and c and 5a and b variation in pressure creates an imbalance of radial forces which may deflect the rotor away from the regions of higher pressure towards regions of lower pressure. The deflection vector (d) of a specific cylindrical portion 26 is the result of the imbalance of radial forces generated in all of the channels 20. No general statement can, therefore, be made about the relationship between the pressure distribution (p) around the periphery of a specific channel 20 and the deflection (d) of the cylindrical portion 26. The pressure distribution is primarily responsible for the shaft deflection.

Figure 4C:
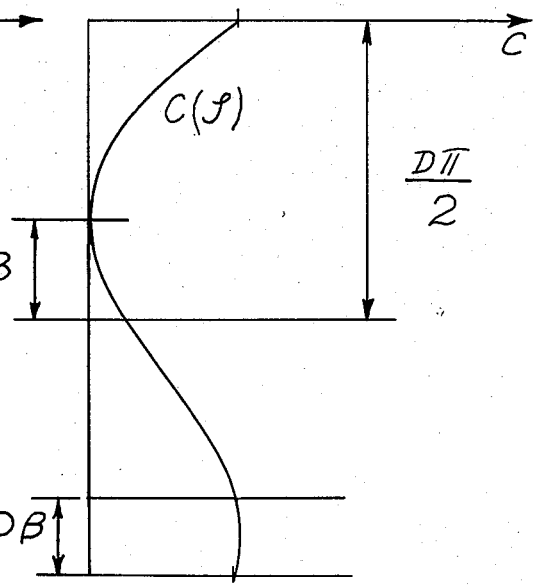
Figure 5A:
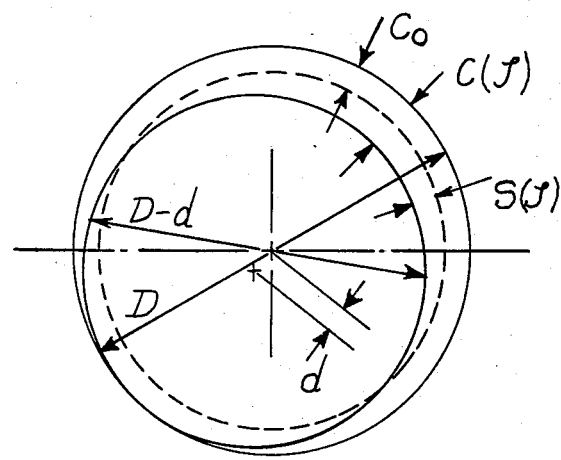
FIG. 5a is a schematic drawing showing the effect of deflection on clearance between the outer diameter of the rotor and the interior surface of the housing.

FIG. 4a shows the rotary processor channel of FIG. 3 developed into a plane. FIGS. 4b and 4c show schematically the pressure distribution (p) and the clearance (c) to the interior surface 14 of the housing 12 respectively, along the circumference of the cylindrical portions 26. The clearance (c) is illustrated in FIG. 5a. It is assumed that the original clearance $(c_0)$ (see FIG. 5a) is slightly greater than the deflection (d) so that the cylindrical portion in the deflected position just does not contact the surface the housing. The clearance (c) is therefore the resultant of $(C_0)$ and $\delta(\phi)$. The rate of leakage flow across the disc can then be calculated to be $$q_L = \int_{\varphi=0}^{\varphi=2\pi} \frac{\pi^{-n} D^{2-n} [\delta(\varphi)]^{2+n}}{24 \, m \, N^{m-1}} \cdot \frac{\Delta p(\varphi)}{l} d\varphi$$

m, n—Power law constants
l—Width of gap
N—RPM

Figure 5B:
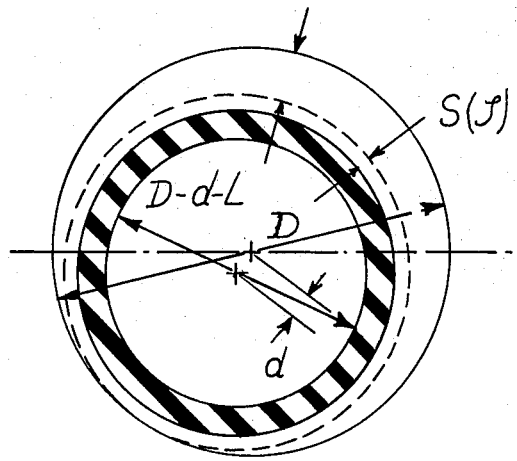
FIG. 5b is a schematic drawing showing the effect of deflection on clearance between the outer diameter of a slightly smaller rotor to the interior surface of the processor housing.

FIG. 5b shows structure in which the diameter D-d of the cylindrical surface is reduced by an amount $\Delta$ to a diameter D-d-$\Delta$ and a flexible seal is provided on the outside of the surface. The flexible seal which is a part of the invention will be discussed in detail later. The shadowed area represents the flexible seal already in the deflected position but prior to the application of pressure. As soon as pressure is applied, the flexible seal deflects an amount (p) which is in general a function of the pressure distribution around the seal. But, if the seal sufficiently flexible, the local pressure will dominate in determining the local deflection. The expression for the leakage flow with the seal deflected is then:

$$q_L' = \int_{\varphi=0}^{\varphi=2\pi} \frac{\pi^{-n} D^{2-n} [\delta(\varphi) + \Delta - p(\varphi)]^{2+n}}{24 \, m \, N^{m-1}} \frac{\Delta p(\varphi)}{l} d\varphi$$

By the proper selection of the deflection characteristic of the flexible seal, which dictates the necessary reduction of the outside diameter of the cylindrical surface (D—d—$\Delta$), the leakage can be reduced.

In accordance with the present invention, seals in the form of nested truncated conical members 30 are interposed between cylindrical surface portions 26 of the rotor 10 and the cylindrical surface 14 of the housing to resist leakage of fluid material being processed (See FIGS. 1 and 2). As explained below, the members 30 are constructed and disposed so that pressure increase in the channel 20 increased the sealing action. These truncated conical members 30 may be formed of any suitable, stiffly-resilient, thin material such as steel, stainless steel, bronze or other material, or even engineering plastics such as nylon or polycarbonates where temperatures and chemical conditions permit. The members 30 may be in the form of loops or turns of a helix 30' having a plurality of turns, with adjacent turns in face-to-face relation to form a nested structure with each 360° turn forming a truncated substantially conical member, as shown in FIG. 6 or may be nested closed 360° rings 30" as shown in FIG. 7.

As shown in FIGS. 1 and 2, the members 30 are carried by the rotor 10 in an orientation such that the surfaces 32 of the member slope toward the channel 20, i.e. the high pressure region, and with the inner edges 34 of the member 30 farthest from the channel 20 held against axial movement and in sealing relation to the rotor by a shoulder 36 and a retaining member, shown as a ring 38. This retaining member 38 acts on the member 30 farthest from the channel to keep the member 30 in nested relation against the shoulder 36. The outer, free, edges 40 of the members 30 closest to the channel 20 are in sealing relation to the interior cylindrical surface 14 of the housing 12 so that the members 30 seal the space between the rotor 10 and the interior of the housing 12.

Pressure action on the face of the member deforms it elastically and, since one edge 34 of each member is fixed, the free edge 40 of the member 30 is pressed against its adjacent surface 14 with a force directly proportional to the pressure and inversely proportional to the stiffness of the nest of conical members. In other words, the higher the pressure, the greater the sealing effectiveness.

Any recess or pocket 41 between the inner face of the seal and the adjacent rotor portion allows material being processed to leave the channel and lodge there. Such material tends to become degraded and may leave and become mixed with the material being processed. To overcome this disadvantage, the seal design may be modified as shown in FIG. 2 in which portions of the rotor 10 are cut away leaving a lip portion 42 which is flexible because of the thinness of the web 44. The edge of the lip will rest against the inner surface of the innermost conical member 30 to seal the pocket or cavity. By selecting the proper thickness of the web 44 of the flexible lip 42, so that it is more flexible than the seal, the lip 42 will always remain in contact with the flexible seal so that material which might enter the cavity 41 between the lip and the flexible seal will remain there and will be prevented from contaminating the processed material.

A further advantage of the flexible lip arrangement is that it enables the unbroken wall surface 24 to extend out as far as possible to minimize leakage past the end block.

An important advantage of the seal of the nested conical members 30 is the ability of the envelope defined by the edges of the members to substantially retain its shape when acted on by pressure from material in the channel. Thus any desired stiffness may be secured by increasing or decreasing the number of members in the seal without the disadvantage inherent in using a single thicker member that flexing of the thick member would bring its edge out of parallelism with the adjacent surface.

The advantage in selecting as design a plurality of members shaped into truncated cones can readily be demonstrated by comparing two cantilever beams of the same thickness H, and length, L, carrying the same load, P, one being solid (FIG. 8) and the other being assembled from n thin layers (FIG. 9). With the single beam deflection $$Y = \frac{4PL^3}{EWH^3},$$

maximum stress $$\delta = \frac{6PL}{WH^2},$$

while with a beam assembled from thin layers, deflection $$Y = \frac{4PL^3 n^2}{EWH^3},$$

maximum stress $$\delta = \frac{6PLn}{WH^2}$$

The beam assembled from thin layers deflects $n^2$ times more for the same load P than the solid beam. Moreover, at a stress level which is n times greater, if both beams are loaded to the same stress level, the deflection which can be obtained with a multi-layer beam is still n times greater than that obtainable with a solid beam.

A factor affecting the resistance to flexing of the nest of conical member 30 is the extent of the members which is free to flex. In a simple case where the members 30 are held between a retaining ring 38 and a shoulder 36, the extent of the members free to flex in response to pressure in the channel 20 would be the distance along a generatrix of the cone between the edge 46 of the retaining ring 38 and the free edge 40 of the conical member. Where the outer diameter of the members 30 is greater than the inner diameter of the cylindrical surface 14 of the housing 12, the initial pressure of the edges 40 of the members against the surface 14 is a function of the stiffness of the members 30, the distance along a generatrix between the edge 44 of the shoulder 36 and the outer edges 40 of the members and the relative positions of the edge 46 of the retaining ring and the edge 44 of the shoulder, where the edge 48 of the shoulder 36 serves as a fulcrum. The extent of member 30 free to flex may be determined by the diameter of the retaining ring 38 (for example inwardly of the shoulder 48, as shown in FIG. 2 where the retaining rings are mounted on the rotor) so that the portion of the member 30 radially inward from the edge 48 of the shoulder 36 to the line of contact of the conical member with the retaining ring 38 is free to flex. This extent of member free to flex in this arrangement enables satisfactory accommodation to any irregularities in the surface 14 against which the free member edges 40 bear and is of particular advantage where the axis of the rotor 10 and of the housing 12 are offset to give greater sealing effectiveness at regions of higher pressure. A preload of the members against the adjacent surface 14 may be secured in structure as shown in FIG. 10, by positioning the retaining ring 38a axially closer to the shoulder 36a than the position at which the inner edge portions 34 of the unflexed members 30 would engage so that the members are resiliently preloaded to increase pressure of the free edges 40 against the adjacent surface 14. With this form, the shoulder 36a is given a shape including a undercut 37, allowing movement of the inner edges 34 of the members to a position giving the desired resilient characteristic.

The vertex angle of the conical members may be selected to balance the various requirements for sealing particular apparatus. It will be apparent that the greater the vertex angle, that is the flatter the cone, the greater the increase in bearing pressure with increase of fluid pressure. On the other hand, the smaller the angle and the sharper the cone, the greater the ability of the edge portions to accommodate the irregularities in the inner surface of the housing or the displacement of the axes of rotor and housing. In general, vertex angles of from about 150° to about 100° are preferred.

It has been shown above that a seal combination of a plurality of nested thin conical members will deflect proportionally to the pressure applied. However local deflection of the rotor at any point around its circumference depends not only on the pressure at that point but also on the result of the pressure distributed around the entire circumference To improve the performance of the seal, i.e. to make the local deflection more directly proportional to the local pressure which is required to get optimum sealing, the seal members 30 may be cut in the radial direction down to the diameter at which the seal is clamped, as shown in FIGS. 11 and 12. A number of radial cuts 50, such as 10, 12 or more, would make each section between two cuts behave like a constrained cantilever beam. Alternatively stacks of separate segments may be clamped to the rotor to provide an equivalent of the nested slotted annular conical members. In order to avoid leakage through the slots separating the individual sections, the conical member 30 directly exposed to the fluid under pressure (the innermost member) is a solid member without slots but with a minimum thickness, thinner than the slotted members, so that it can deflect in every direction and thus not appreciably reduce the deflection of the seal in response to the local pressure. The assembly of the slotted conical member with the ring on the inside which is not cut is shown in FIG. 12.

In a modification (see FIG. 13) of the processing apparatus referred to above, graduated sealing effectiveness is provided to take into account the fact that pressure in a channel 20 ordinarily increases in an angular direction through action of the channel walls 24 on the material being processed from lowest pressure adjacent the inlet opening 28 to greatest pressure adjacent the outlet opening 29. When the apparatus is in full operation, these pressures automatically increase the sealing action of the conical members as a function of the increase in pressure; but, if extra sealing action in a selected portion of the channel is desirable and may be secured by displacing the axis of the rotor 10 toward the portion 46 where such extra sealing action is desired.

In designing a seal, especially for a polymer processing machine, such as the rotary channel processor, it will in some cases be desirable to allow a certain controlled amount of leakage. In other cases it might be better or even imperative to prevent leakage altogether.

FIG. 14 represents the case with controlled leakage. In this case an initial clearance C is provided between the outer edges 40 of the members 30 of the seal and the cylindrical surface 14 of the housing 12. The operating pressure p acts on the members 30 as shown in FIG. 14. Due to the flow of polymer, a triangular pressure distribution diagram with the maximum pressure equal to the operating pressure p is acting on the outer edges 40 of the members 30. The problem is now to design the seal with a characteristic so that the clearance C changes with changes of the pressure p. The characteristic of the seal can be varied so that the leakage flow of the polymer can increase, remain constant, or decrease with increasing operating pressure p. The variable available to the designer are the inner diameter $D_1$ of the members 30, the outer and inner clamping diameters $D_2$ and $D_3$ as indicated on the drawing, the thickness and number of the conical members, their material, and the initial clearance $C_O$. The problem of selecting the proper design parameters is a rather complicated one but it can be solved by using finite element stress analysis. FIG. 15 shows the deflection of the members 30 as established by the finite element analysis and FIG. 16 is a presentation of the stresses in the seal under the operating condition shown in FIG. 14. The actual values for deflection and stress in the case of FIGS. 15 and 16 can be determined directly from the computation results.

To design a seal for the case of no leakage, a different characteristic of the seal is required. The loading of the seal in this case is as shown in FIG. 17. The operating pressure p acts on the side of the seal. The characteristic of the seal must be such that the specific contact pressure $P_N$ between the outer edges 40 of the members 30 and the operating channel 20 of the processor must be slightly higher than the operating pressure p in order to ensure proper sealing. The pressure distribution across the outer edges 40 of the member is then automatically established by the characteristic of the seal which, in turn, is given by the design parameters as discussed before. In order to facilitate assembly of the machine, an initial clearance $C_O$ will have to be allowed for. At very low pressures the seal will, therefore, slightly leak and the loading diagram as shown in FIG. 14 applies. At a pressure p where the triangular load on the circumference of the seal with p at the leading edge is not sufficient to keep the seal open, the seal will close and the external pressure due to the flow of hot melt will be replaced by a contact pressure between the outer edges 40 of the members 30 of the seal and the cylindrical surface 14 of the housing 12 with a $P_N$ larger than p as shown in FIG. 17. Here again, the design can be established to a high degree of accuracy, using the finite element method.

For most purposes it is appropriate to use members 30 of the same size. However, the pressure acting on the outer edges 40 of the members 30 of the seal results in friction between the members 30 and the cylindrical surface 14, creating a loss in power which is locally converted into heat. Since $p_N$ is normally in the order of 1,000-3,000 psi, this loss can be substantial if a certain width of seal is required in order to attain the necessary seal stiffness. To improve that situation, the seal can be built as shown in FIG. 18. Only the first few conical members 30 have an outer diameter to make contact with the cylindrical inner surface 14 of the housing 12, creating pressure $p_N$ which is higher than the operating pressure. The outside diameter of the remaining members 30 is reduced so that they can provide stiffness but do not contact the cylindrical surface 14. The contact pressure between seal and surface 14 is, therefore restricted to a relatively small area, thus minimizing the resultant normal force and, therefore, friction losses and heat generation. This arrangement also allows easier flexing of extreme edge portions of the full diameter members for superior sealing response to the action of pressure while providing stiffness in major portions of the members to withstand pressure developed.

Having thus described our invention, what we claim as new and desire to secure by Letters Patent of the United States is:

1. In a machine for processing plastic and polymeric materials which are, or become in the course of processing, viscous liquids comprising:
   A. a rotatable element comprising a rotor carrying at least one channel including opposed side walls;

B. a stationary element providing a coaxial surface cooperatively arranged with said channel to provide an enclosed processing passage;

C. means including an inlet opening to feed polymeric or plastic material to said passage;

D. means for causing relative rotation between said channel and said coaxial surface about their common axis to move said side walls in a circumferential direction from the inlet opening of said passage;

E. an outlet opening from said passage circumferentially disposed a major portion of a complete revolution from said inlet opening in the direction of rotation of said channel; and F. a blocking member comprising an end wall and scraper portions disposed in said passage between said outlet opening and said inlet opening in the direction of rotation of said channel so that material in contact with said walls is dragged forward against said blocking member in said channel for processing and discharge;

the improvement which comprises a seal structure arranged on at least one side of said channel, said structure including a plurality of annular conical members of thin, stiffly resilient sheet material of narrow width disposed between said channel and said coaxial surface, the sheet material of said annular member extending at an angle to said coaxial surface whereby each 360° of annular member is substantially a truncated cone and the cones of the plurality of annular members are in nested relation with inner edge portions of said annular members adjacent and in position to resist flow from said channel and outer edge portions adjacent to said coaxial surface member, and means for fixing said seal structures to said rotor and for acting on the annular member of each structure farthest from said channel to hold inner edge portions of said annular member farthest from said channel against being displaced by pressure from said channel and to maintain said annular members in a sealing relation with said coaxial surface and said channel with said outer edge portions adjacent said coaxial surface being free and displaceable by pressure.

2. A machine of claim 1 in which said seal structures are arranged on opposite sides of said channel and said conical annular members are fixed to said rotor with inner faces of members on opposite sides of said channel converging toward each other.

3. A machine of claim 1 in which said annular conical members are held between a ring and a shoulder of said rotor on each side of said channel.

4. A machine of claim 3 in which said shoulder is axially undercut inwardly of its outer diameter and said ring is axially adjustable to apply controlled axial force on inward portions of said annular conical members to control the pressure of free edges of said annular conical members against said coaxial surface.

5. A machine of claim 1 in which the axis of said rotor is displaced relative to the axis of said coaxial surface to provide increased pressure between the free edges of said annular conical members and said coaxial surface in segments toward which the axis of the rotor is displaced.

6. A machine of claim 1 in which the outside diameter of said annular conical members is selected to allow controlled leakage between the edges of said annular conical members and said coaxial surface.

7. A machine of claim 1 in which one or more annular conical members on each side of said channel has a diameter for sealing engagement with said coaxial surface and one or more annular conical members further from said channel are of lesser diameter to provide stiffness for said first mentioned annular conical members.

8. A machine of claim 1 in which said annular conical members are closed 360° rings.

9. A machine of claim 1 in which radial slots are formed in said annular conical members other than the annular conical members nearest said channel, and said annular conical members nearest said channel are closed 360° rings.

10. A machine of claim 1 in which said annular conical members other than the annular conical member nearest the channel are annular sections in end to end relation and said annular conical member nearest said channel are closed 360° rings.

11. A machine of claim 1 in which said annular conical members are turns of a helix.

* * * * *